(12) United States Patent
Hata

(10) Patent No.: US 6,597,834 B1
(45) Date of Patent: Jul. 22, 2003

(54) OPTICAL FIBER LINEAR LIGHT SOURCE

(75) Inventor: Michiru Hata, Sagamihara (JP)

(73) Assignee: 3M Innovative Properties Company, Saint Paul, MN (US)

( * ) Notice: Subject to any disclaimer, the term of this patent is extended or adjusted under 35 U.S.C. 154(b) by 0 days.

(21) Appl. No.: 09/623,330

(22) PCT Filed: Mar. 10, 1999

(86) PCT No.: PCT/US99/05156

§ 371 (c)(1), (2), (4) Date: Aug. 28, 2000

(87) PCT Pub. No.: WO99/46537

PCT Pub. Date: Sep. 16, 1999

(30) Foreign Application Priority Data

Mar. 13, 1998 (JP) ............................... 10-062780

(51) Int. Cl.⁷ ................................................ G02B 6/26
(52) U.S. Cl. .......................................................... 385/31
(58) Field of Search ..................................... 385/31, 47

(56) References Cited

U.S. PATENT DOCUMENTS

| 5,122,580 A |   | 6/1992  | Zarian et al. |         |
|-------------|---|---------|---------------|---------|
| 5,428,468 A | * | 6/1995  | Zimmerman et al. | 349/62 |
| 5,521,725 A | * | 5/1996  | Beeson et al. | 349/61  |
| 5,987,199 A | * | 11/1999 | Zarian et al. | 362/559 |
| 5,995,690 A |   | 11/1999 | Kotz et al.   |         |
| 6,301,418 B1 | * | 10/2001 | Freier et al. | 362/558 |

FOREIGN PATENT DOCUMENTS

| DE | 195 07 901 A |   | 9/1996  |         |
|----|--------------|---|---------|---------|
| EP | 0 800 036 A1 |   | 10/1997 |         |
| JP | 63-19604     |   | 1/1988  |         |
| JP | 63 155007    |   | 6/1988  |         |
| JP | 1-58482      |   | 12/1989 |         |
| JP | 4-70604      |   | 11/1992 |         |
| JP | 05 232323    |   | 9/1993  |         |
| JP | 6-021940     |   | 1/1994  |         |
| WO | WO 97/26573  | * | 7/1997  | G02B/6/26 |
| WO | WO 98/22749  |   | 5/1998  |         |

* cited by examiner

*Primary Examiner*—Tulsidas Patel
(74) *Attorney, Agent, or Firm*—Stephen W. Buckingham

(57) ABSTRACT

An optical fiber (100) is disclosed which emits light radially along its peripheral surface (12). A light extractor provided on the core (1) includes both a reflective light extraction element (2) and a transmissive light extraction element (3) in order to increase the light emission luminance from the optical fiber, the transmission light extraction element is preferably a light extracting film (3) comprising a plurality of integrally formed light transmissive projections (31) closely adhered to the core (1) and through which light is extracted. Gaps (4) between the film (3) and the core (1) are formed by the projections (31). The optical fiber may be used as a linear light source.

2 Claims, 1 Drawing Sheet

OPTICAL FIBER LINEAR LIGHT SOURCE

FIELD OF THE INVENTION

The present invention relates to an improvement of an optical fiber from which a light beam leaks through its peripheral surface. In particular, the present invention relates to an optical fiber comprising a core which propagates light in its lengthwise direction, and two types of light-extracting elements (the first light-extracting reflective element and the second light-extracting light-transmissive element) which are provided along the lengthwise direction of the core on the peripheral surface of the core.

BACKGROUND

Optical fibers are known, which comprise a core for propagating light which enters from one lengthwise end towards the other end, and reflective means for extracting the light which is provided along the lengthwise direction on the peripheral surface of the core.

The light-extracting reflective means diffusively reflects a part of light beams, which may otherwise reach the other end by repeated total reflection on the inner surface of the core, among the light beams propagating the core, and allows such a part of light beams leak from a part of the peripheral surface opposite to the part of the peripheral surface on which the light-extracting means is provided. Thus, the light beams can be extracted along the lengthwise direction of the core. Such peripheral surface-light-extracting type optical fibers are used as substitutes for glass tube type linear light sources such as fluorescent lamps, cold cathode tubes, neon tubes, and the like.

For example, JP-B-4-70604, JP-B-1-58482, and JP-A-621940 disclose, as reflective light-extracting means, a diffusively reflective membrane comprising a flat resin film containing diffusively reflective particles dispersed therein, the flat surface of which is in contact with a core. Such a diffusively reflective membrane is usually formed from a coated layer of a dispersion containing a light-transmitting resin and diffusively reflective particles, and does not substantially allow the light transmission.

Among the light beams which propagate the core, a part of the light beams, which reach the peripheral surface of the core in contact with the diffusively reflective membrane and are reflected by the diffusively reflective membrane, and then leaks outside the core through the light-extracting peripheral surface. On the other hand, the light beams do not substantially leak outside the core through the diffusively reflective membrane. Thus, such a diffusively reflective membrane is one of the most suitable light-extracting means for increasing light-emission luminance on the light-extracting peripheral surface of the optical fiber.

The diffusively reflective particles are usually inorganic white powders having high refractive indexes. The light-transmitting resin is usually one having a refractive index which is higher than that of the optical fiber material but is different from that of the diffusively reflective particles.

For the increase of the light-emission luminance, in general, the refractive index of the inorganic particles is increased, and the content of the inorganic powder is increased as much as possible.

As explained above, the use of the light-extracting means such as the diffusively reflective membranes allows the light beams to be extracted along the lengthwise direction of the core, and the optical fiber can be used as a substitute for a linear light source such as a fluorescent lamp. However, it has been very difficult to increase the light-emission luminance only with the diffusively reflective membrane, because the refractive index of the organic powder is at most about 3, and it is very difficult to obtain organic powder having a refractive index of higher than 3, or to disperse the large amount of the organic powder in the resin.

SUMMARY OF THE INVENTION

The present invention is to provide a peripheral surface-light-extracting type optical fiber having a high light-emission luminance which cannot be attained by the use of only a reflective light-extracting means.

To achieve the above object, the present invention provides an optical fiber comprising a core which propagates light in its lengthwise direction, and a light-extracting means provided along the lengthwise direction of the core on at least a part of the peripheral surface of said core,
wherein said light-extracting means comprises
  a) the first light-extracting reflective element and
  b) the second light-extracting light-transmissive element which is provided on a part of the peripheral surface of said core through which a light beam, which has been reflected by the first light-extracting element, leaks outside the core.

DETAILED DESCRIPTION OF THE PREFERRED EMBODIMENT

Figure 2:
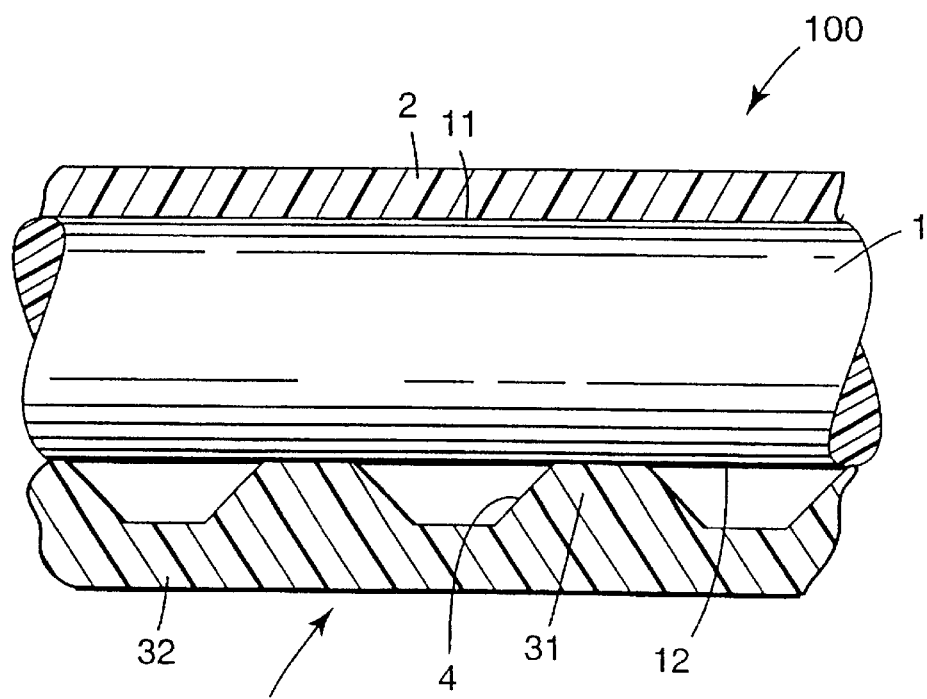
FIG. 2 shows a schematic cross section of an example of an optical fiber of the present invention.

The optical fiber of the present invention is explained by making reference to FIG. 2. In the optical fiber (100), the light-extracting means, which is provided on the peripheral surface of the core (1), comprises a) the first light-extracting reflective element (2) provided on the peripheral surface (11), and b) the second light-extracting light-transmissive element which is provided to cover a part (12) of the peripheral surface of the core through which a light beam, which has been reflected by the first light-extracting element (2), leaks outside the core (1) (light-extracting peripheral surface), that is, a light-extracting film (3) in FIG. 2. Thus, the optical fiber can emit light in a high luminance level which is hardly achieved only by the first light-extracting element (2).

The second light-extracting element comprises a light-transmissive light-extracting film. An example of such a light-extracting film is a film (3) which comprises i) a light-transmissive substrate (32) having substantially flat two main surfaces, and ii) a plurality of light-transmissive projections (31) which are provided on one of the main surfaces of the substrate (32), are formed integrally with the substrate (32), and have substantially the same height, and which can be closely adhered to the peripheral surface (12) of the core (1) through the projections so that a gap (4) (dent) is formed and maintained between the light-extracting film and the core. Herein, the term "formed integrally" means that they are in the form of a single piece.

The protrusions have a refractive index of at least 1.1. Thus, it is possible to extract a part of the light beams, which may propagate inside the core and reach the light-extracting surface in contact with the projections, and are totally reflected on the inner surface of the core, if no light-extracting light-transmissive film is provided. That is, the light beams which reach the peripheral surface of the core in contact with the projections enter inside the projections, and reflected or scattered at the interface between the gap and the projections. Then, the light beams can be extracted outside the core through the light-extracting film.

The refractive index of the projections is preferably between 1.2 and 2.5, more preferably between 1.3 and 2.0. When the refractive index of the projections is less than 1.2, the light-emission luminance may not be increased. When it exceeds 2.5, the luminance increases only at the light-incident end of the core, and the core may not emit light uniformly over the entire length.

The refractive index of the projection is preferably almost the same as or larger than that of the core. The difference $\Delta$ of the refractive index between the core (C) and the light-extracting film (F) ($\Delta = F - C$) is usually between $-0.1$ and $+1.0$.

The light transmission of the projections is not limited, insofar as the effects of the present invention are not impaired. In general, the light transmission of the projection is at least 70% in the whole wavelength band of between 400 and 800 nm, when measured with a photospectrometer.

Herein, the light transmission of other materials is also measured in the same way as above.

The sizes of the gap, which is formed when the light-extracting film is adhered to the peripheral surface of the core, are not limited, insofar as the effects of the present invention are not impaired. For example, a distance between the tops of the adjacent two projections is usually between 0.001 and 500 mm, preferably between 0.01 and 50 mm, more preferably between 0.02 and 10 mm. The height of the gap (the distance from the peripheral surface of the core to the bottom of the dent) is usually between 0.001 and 10 mm, preferably between 0.01 and 5 mm.

When the sizes of the gap are too small, the light extraction becomes difficult, and thus the luminance tends to decrease. When they are too large, the whole optical fiber becomes bulky, the appearance of the optical fiber may deteriorate, or the processability of the optical fiber may decrease.

Depending on the modulus of the projections, when the sizes of the gap are too large, the maintenance of the gap may become difficult.

An area of the top of one projection of the light-extracting film is usually between $10^{-4}$ to 25 mm$^2$, preferably between $10^{-3}$ to 10 mm$^2$. When the area of the top is too small, the light-emission luminance from the optical fiber tends to decrease. When, this area is too large, the uniformity of the light-emission luminance may deteriorate, so that the appearance of the optical fiber in the light-emitting state may deteriorate.

As the second light-extracting element, light-extracting films other than the light-transmissive light-extracting film explained above may be used. For example, a film comprising a light-transmitting resin and bubbles dispersed in the resin may be used. Alternatively, a film of a light-transmitting resin containing dispersed polymer particles having a refractive index different from that of the resin, in place of the bubbles, may be used. In the latter film, the difference of the refractive index between the resin and the polymer particles is usually at least 0.05.

As the first light-extracting element, any conventional diffusively reflective membrane can be used.

Core

The core is made of a material which has a transparency of a level sufficient for propagating light which has entered from one lengthwise end of the core to the other end of the core, for example, a material having a refractive index in the range between 1.4 and 2.0. Examples of such a material are quartz glass, optical glass, plastics, and the like.

As the core, a solid core made of the above transparent material, a liquid-enclosed core comprising a flexible plastic tube which encloses a liquid having a relatively high refractive index such as a silicone gel, and the like can be used. In the case of the solid core, the core is usually covered with a clad after the provision of the light-extracting means. The material of the clad is usually a transparent material having a refractive index less than that of the core.

Examples of the polymers for the core are light-transmitting polymers such as acrylic polymers, polymethylpentene, ethylenevinyl acetate copolymers, polyvinyl chloride, vinyl acetate-vinyl chloride copolymers, and the like. The refractive index of the polymer is usually between 1.4 and 1.7, and the light transmission of the polymer is usually at least 80%. The polymer may be crosslinked to impart sufficient mechanical strength against bending.

The production method of the solid core will be explained by making reference to an acrylic polymer core.

Firstly, an acrylic monomer as the raw material of the core is filled in an elongate tube having an opening on at least one end, and heated step by step so that the polymerization reaction of the monomer in the tube proceeds successively from one end to the open end. That is, a heating site is traversed from one end to the open end. The reaction is carried out while the mixture is pressurized with a pressure gas in contact with the monomer. It is preferable to further heat the tube for several hours to completely finish the reaction after the tube is heated to the open end.

Examples of the acrylic monomer as the raw material of the core are i) (meth)acrylates, homopolymers of which have Tg of 0° C. or higher (e.g. n-butyl methacrylate, methyl methacrylate, methyl acrylate, 2-hydroxyethyl methacrylate, n-propyl methacrylate, phenyl methacrylate, etc.), ii) (meth) acrylates, homopolymers of which have Tg of lower than 0° C. (e.g. 2-ethylhexyl methacrylate, ethyl acrylate, tridecyl methacrylate, dodecyl methacrylate, etc.), and mixtures of one or more of the monomers i) and one or more of the monomers ii). In the case of the mixtures, a weight ratio of the (meth)acrylate i) (H) to the (meth)acrylate ii) (L) (H:L) is usually between 15:85 and 60:40.

Furthermore, the monomer or mixtures of the monomers may contain, as a crosslinking agent, a polyfunctional monomer (e.g. diallyl phthalate, triethylene glycol di(meth) acrylate, diethylene glycol bisallylcarbonate, etc.).

The acrylic polymer core, which has been produced as above, consists of a uniform polymer from one end to the other along its length, and has good light-propagation properties and sufficient mechanical strength against bending. Thus, the processing of the optical fiber is easy.

The tube used in the above production method is preferably made of a fluoropolylmer such as a tetrafluoroethylene-hexafluoropropylene copolymer (FEP), and the like. The production method of such a flexible optical fiber (core) is disclosed in JP-A-63-9604.

The cross section of the core perpendicular to the lengthwise direction of the core may be of any shape that can maintain the flexibility of the core, for example, a circule, an ellipsoid, a semicircule, an arc having a center angle of larger than 180 degrees, and the like.

The diameter of the core is usually between 5 and 40 mm, preferably between 10 and 30 mm, when the cross section of the core is a circle.

First Light-extracting Element

As the first light-extracting element,

I) a diffusively reflective membrane in contact with the peripheral surface of the core, II) a diffusively reflective part formed by roughening the peripheral surface of the core, or III) a plurality of linear flaws formed on the peripheral surface of the core in the direction perpendicular to the lengthwise direction of the core can be used.

As the diffusively reflective membrane, a) a resin film containing diffusively reflective particles dispersed therein, b) an adhesive film comprising a diffusively reflective substrate, and a transparent adhesive which adheres the substrate to the peripheral surface of an optical fiber, or c) an adhesive film comprising a reflective substrate, and a transparent adhesive layer which is formed so that the adhesion surface has unevenness can be used.

The diffusively reflective particles are, for example, inorganic white powder having a refractive index in the range between 1.5 and 3.0. Preferable examples of such inorganic powder are barium sulfate (refractive index: 1.51), magnesia (refractive index: 1.8), titania (refractive index: 2.6), and the like.

The resin constituting the diffusively reflective membrane is preferably a light-transmitting resin having a refractive index, which is higher than that of the core material and is different from that of the diffusively reflective particles. Preferable examples of such a resin are acrylic resins, silicone resins, polystyrene resins, polyolefin resins, and the like.

A mixing ratio of the resin to the diffusively reflective particles is 5 to 10,000 wt. parts per 100 wt. parts of the particles.

The diffusively reflective membrane may contain coloring pigments, so that the white light, which has been supplied in the core, is extracted as colored light.

The diffusively reflective membrane is easily formed from a coating film of a dispersion containing the above resin and diffusively reflective particles. For example, the dispersion is applied directly on the peripheral surface of the core, or the coating film, which has been formed on a temporal substrate, is transferred to the peripheral surface of the core. In the transfer method, the reflective membrane can be easily transferred, when an adhesive polymer is added to the resin.

The dispersion may be prepared using dispersing apparatus such as a sand mill, a kneader, a roll mill, a planetary mixer, and the like. For the formation of the coating film, coating apparatus such as a roll coater, a knife coater, a bar coater, a die coater, and the like may be used.

The thickness of the diffusively reflective membrane is usually between 1 and 2000 $\mu$m, preferably between 5 and 1000 $\mu$m, more preferably between 10 and 800 $\mu$m. When the thickness is too low, the amount of extracted light from the core decreases so that the luminance on the light-emitting surface tends to decrease. When the thickness is too high, the flexibility of the optical fiber deteriorates, so that the diffusively reflective membrane tends to be broken.

The width of the diffusively reflective membrane (a size in the direction perpendicular to the lengthwise direction) depends on the amount of the light to be extracted, and is usually between 1 and 35 mm.

The diffusively reflective membrane may comprise one or more striped membranes which are arranged in the lengthwise direction of the core.

The diffusively reflective membrane may be arranged continuously or discontinuously in the lengthwise direction. When the membrane is discontinuously arranged, the sizes of the discrete portions of the membrane may be different. Alternatively, a plurality of membranes having equal length and extended in the width direction are arranged in the form of "a bar code with an even interval". Furthermore, the membranes may be printed in the dot form.

The light beam reflected on the diffusively reflective membrane has the highest intensity in the direction towards the peripheral surface (light-extracting surface) facing the diffusively reflective membrane, and most of the reflected light beam are extracted.

Alternatively, a light-transmissive diffusively reflective membrane can be used. In this case, light beams, which pass through the diffusively reflective membrane and are extracted, are also utilized. However, the light transmission of the diffusively reflective membrane is preferably low (for example, 30% or less) for the increase of the directivity of the light, and the effective increase of the luminance.

The diffusively reflective membrane may contain various additives in addition to the above materials, insofar as the effects of the present invention are not impaired. Examples of the additives are crosslinking agents, UV-light absorbers, heat stabilizers, surfactants, plasticizers, antioxidants, fungicidals, colorants, photo-storaging materials, tackifiers, and the like. The colorants include conventional pigments and dyes, and also fluorescent dyes and pigments.

Second Light-extracting Element

The second light-extracting element usually comprises a light-transmissive light-extracting film. A preferred embodiment of such a light-extracting film comprises i) a light-transmissive substrate having substantially flat two main surfaces, and ii) a plurality of light-transmissive projections which are provided on one of the main surfaces of the substrate, are formed integrally with said substrate, and have substantially the same height; in which the protrusions have a refractive index of at least 1.1; and the light-extracting film is formed so that it is in contact with the peripheral surface of the core through the projections so that a gap is maintained between the light-extracting film and the peripheral surface of the core through which the reflected light beam leaks outside the core.

The adhesion of the light-extracting film may be achieved by, for example, the use of self-adhesion properties of the projections, or the use of a light-transmissive adhesive. An acrylic adhesive may be used as the light-transmissive adhesive.

The modulus of the above projections is selected so that the above gap can be maintained. In general, the modulus of the projections at 25° C. is preferably between $5 \times 10^5$ and $10^{10}$ dyne/cm$^2$. When the modulus is less than $5 \times 10^5$ dyne/cm$^2$ the projections may plastically flow with time, and thus the shape of the gap may not be maintained. When the modulus exceeds $10^{10}$ dyne/cm$^2$, the core surface may be damaged, when the light-extracting film is adhered to the core.

When the decrease of $\log_{10}G$ in the temperature range between 25° C. and 125° C. is less than 1.0 in addition to the above limitation on the modulus G, the maintenance properties of the gap, which is formed between the light-extracting film and core, are significantly improved. When the decrease of $\log_{10}G$ exceeds 1.0, that is, when the change of $\log_{10}G$ in this temperature range is less than $-1.0$, the protrusions may plastically flow with time.

The modulus G of the substrate is not limited, but it is preferably in the same range as that of the projections, when the substrate is formed integrally with the projections.

Herein, the "modulus G" is a value measured by a dynamic viscolasticity method under a shear mode at a frequency of 1 rad/sec.

For example, an acrylic polymer is used so that the projection and/or substrate have the above specified modulus. Such a polymer can be prepared by polymerizing a raw material containing an alkyl (meth)acrylate, and an ethylenically unsaturated acid.

Alternatively, such a polymer may be prepared by polymerizing a raw material containing an acryl-modified polymerizable prepolymer or oligomer such as urethane acrylate, etc. Apart from the acrylic polymers, rubbery polymers such as silicone rubbers, butyl rubbers, styrene rubbers, etc., and also polymers such as polyurethane may be used.

The projections may be of any shape, insofar as the effects of the present invention are not impaired. Preferably, the cross section of the projection is substantially rectangular. Such a shape has a contact surface with a sufficient area, and good processability. For example, the cross sectional shape of the projection is a rectangle having a width of 0.01 to 5 mm, or a trapezoid having an upper side of 0.01 to 5 mm and a lower side of 0.02 to 10 mm.

The substrate is made of the same material as that of the projections containing the crosslinked acrylic polymer, and formed integrally with the projections. The thickness of the substrate is usually between 0.01 and 2 mm, preferably between 0.05 and 1 mm, more preferably between 0.1 and 0.5 mm. When the substrate is too thin, it may be broken during the use. When it is too thick, the light-extracting film becomes too thick, so that the handling of the film or the appearance of the film adhered to the peripheral surface of the core deteriorate.

The dents (the spaces between the adjacent projections) may be arranged in a regular geometrical pattern almost over the whole area of one main surface of the substrate. As the geometrical pattern, cross stripes, hound's tooth checks, parallel stripes, and the like can be used.

The number of the arranged dents in a unit area is usually between 0.3 and 50 dents/cm$^2$, preferably between 0.5 and 25 dents/cm$^2$. When the number of the dents is too low, the effects for increasing the luminance may deteriorate. When the number of the dents is too high, the uniformity of the luminance tends to decrease.

The dent may be of any shape. For example, the shape is a geometrical shape such as a cylinder, a semi-cylinder, a square pillar, a pyramid, a cone, a semi-cone, a truncated cone, a semisphere, a semi-ellipsoid, and the like. The dents may be a complexed shape of two or more of such shapes. The gap between the dents and the core surface may form a closed space, or an open space communicating outside.

The width of the light-extracting film (a size in the direction perpendicular to the lengthwise direction) may be selected so that a desired illumination angle (or viewing angle) is obtained. For example, for maximizing the illumination angle (or the viewing angle), the light-extracting film is arranged so that it covers all the parts which have no first light-extracting element. For effectively increasing the luminance in the relatively narrow illumination angle (or viewing angle), the light-extracting film is partly arranged so that the light-extracting surface is included. In general, a center angle is between 20 and 120 degrees, when the core part, with which the light-extracting film is in contact, is assumed as an arc in the cross section perpendicular to the lengthwise direction of the core.

The above described light-extracting film is disclosed in U.S. patent application Ser. No. 08/755,767 filed by the applicants.

Acrylic Polymers for Light-extracting Films

The acrylic polymers used as the light-extracting films are preferably crosslinked. The crosslinked acrylic polymers may be prepared by polymerizing raw materials comprising an alkyl (meth)acrylate, an ethylenically unsaturated acid, and a crosslinking monomer having at least two (meth)acryl groups in a molecule.

Examples of the alkyl (meth)acrylate (representing "alkyl acrylate" or "alkyl methacrylate") are alkyl acrylates and alkyl methacrylate, in which the alkyl group is at least one alkyl group selected from the group consisting of methyl, ethyl, isopropyl, butyl, isobutyl, 2-ethylhexyl, isooctyl, lauryl, stearyl, cyclohexyl, isobornyl, 2-hydroxyethyl, 2-hydroxypropyl, methoxyethyl, ethoxyethyl, dimethylaminoethyl, diethylaminoethyl, and glycidyl, as well as mixtures of two or more of them.

Examples of the ethylenically unsaturated acid are (meth)acrylic acid (representing "acrylic acid" or "methacrylic acid"). The (meth)acrylic acid increases the cohesive force of the acrylic polymers, and improves the shape-maintenance properties and mechanical strength of the projections. As other ethylenically unsaturated acids, β-hydroxyethylcarboxylic acid, itaconic acid, maleic acid, fumaric acid, and mixtures of two or more or them may be used.

The amounts of the alkyl(meth)acrylate (A) and ethylenically unsaturated acid (E) are selected so that the modulus of the projection is in the desired range. Preferably, a weight ratio of A to E is between 80:20 and 99:1.

1,6-Hexanediol diacrylate is preferable as a crosslinking monomer having two or more (meth)acryl group. 1,6-Hexanediol diacrylate can effectively increase the crosslinking density of the acrylic polymers, and improve the shape-maintenance properties and mechanical strength of the projection in good balance.

The content of the crosslinking monomer is usually between 0.5 and 5 wt. % based on the whole raw materials.

It is possible to prepare a crosslinked acrylic polymer by the use of an acryl-modified prepolymer such as urethane acrylate, or oligomer in place of the above ethylenically unsaturated acid and/or crosslinking monomer. When such a prepolymer or an oligomer is used, the modulus of the projections is effectively increased, and the shape-maintaining properties of the projections is easily improved.

The acrylic polymer may be prepared by polymerizing a raw material containing the above components as a starting material by heating, or by the irradiation of UV light, electron beams, and the like.

For example, as explained below, the raw material is polymerized (and also crosslinked) while allowing the raw material in contact with a mold having a specific geometrical shape to form a light-extracting film. In this case, the raw material components containing no crosslinking monomer are partially polymerized to obtain a partially polymerized syrup having an adjusted viscosity, and then the mixture of this syrup and the crosslinking monomer is polymerized and crosslinked while allowing the mixture in contact with the mold.

A polymerization initiator may be used for the effective polymerization. Examples of the polymerization initiator are benzophenone based photopolymerization initiators (e.g. IRGACURE™ 651 available from CIBA-GEIGY (now NOVARTIS)), and the like.

Production of Light-extracting Film

In one preferred embodiment of the present invention, the light-extracting film can be produced as follows:

A raw material containing the above components in specified amounts, and a polymerization initiator are supplied in a mixing equipment, and polymerized with the irradiation of UV light while mixing. In this step, the reaction mixture is partially polymerized so that the viscosity of the reaction mixture is in the range between 100 and 100,000 cps, to obtain a partially polymerized syrup. When a crosslinking monomer is used, the specified amount of the crosslinking monomer is added to this syrup together with the additional amount of a photopolymerization initiator, and mixed to obtain a uniform mixture. Thus, a raw material composition for the light-extracting film is obtained. Prior to the polymerization, the mixing equipment is usually purged with an inert gas such as nitrogen gas.

A mold for molding a light-extracting film having a specific geometrical shape is produced as follows:

Firstly, a positive mold made of a relatively hard plastic or a metal is provided. Examples of such plastic is acrylic resins, polycarbonate, and the like.

A releasing resin is allowed in contact with the mold, and cured with UV light. Then, the cured releasing resin is removed from the mold to obtain a negative mold. Examples of the positive mold are ACRY SUNDAY SERIES available from ACRY SUNDAY Co., Ltd., and an example of the releasable resin is MOLDING SILICONE SE 9555 available from TORAY DOW CORNING Co., Ltd.

Next, the above raw material mixture for the light-extracting film is allowed in contact with the negative mold, and then covered with a transparent releasable film. In this step, the negative mold and the releasable film are placed with separating them at a certain distance so that a part for forming the substrate of the light-extracting film and a part for forming the projections are formed when the mixture is polymerized and crosslinked, that is, cured. In this state, the mixture is irradiated with UV light through the releasable film to complete the curing reaction. Then, the negative mold and releasable film are removed, and the light-extracting film made of the cured material of the above mixture is obtained.

The releasable film is used for cutting off oxygen. Also, the releasable film serves to make the other main surface of the substrate flat. In general, a flexible plastic film such as a polyester film is used as the releasable film.

To adjust the thickness of the substrate, the following method may be used.

The excessive amount of the raw material mixture is poured on the negative mold, and covered with the releasable film, to obtain a laminate having the mixture. Then, the laminate is passed through a knife coater having a gap fixed at a determined distance, so that the excessive portion of the mixture is discharged from the peripheral edges of the laminate. Thus, the thickness and flatness of the part for forming the substrate are adjusted.

When the UV light is used, its wavelength is in the range between 300 and 400 nm, and an irradiation intensity is in the range between 330 and 1000 J/cm$^2$.

The light-extracting film used in the present invention may contain various additives, insofar as the effects of the present invention are not impaired. Examples of the additives are tackifiers, plasticizers, UV light absorbers, antioxidants, colorants, fillers, and the like.

The other main surface of the substrate may be laminated with a non-tacky plastic film. The light transmission of such a plastic film is at least 80% when measured with a photospectrometer in the wavelength band of between 400 and 800 nm.

EXAMPLES

Example 1

An optical fiber of this Example was fabricated by combining the following core, first light-extracting element, and second light-extracting element:

(1) Core

The core of LIGHT FIBER "EL 700" (available from Lumenyte) was used. This core was a solid core. The length of the core was 1 m, and the diameter of the cross section (a circle) was 18 mm. The core had a refractive index of 1.49.

(2) First Light-extracting Element (Diffusively Reflective Membrane)

A pre-dispersion was prepared from a mixture of titanium oxide (100 wt. parts) as diffusively reflective particles, a dispersible polyurethane as a light-transmitting resin ("UR-8700" available from TOYOBO; an aromatic polyurethane having a sodium sulfonate group as a hydrophilic group in a molecule) (10 wt. parts), and a solvent (methyl ethyl ketone), using a sand mill.

Then, the pre-dispersion and an acrylic adhesive (300 wt. parts) were mixed to obtain a coating composition, and the coating composition was applied on a releasable film and dried to form a transfer type adhesive film for forming a diffusively reflective membrane. The adhesive was an acrylic copolymer obtained by polymerizing a monomer mixture comprising isooctyl acrylate. The releasable film was a PET film having a thickness of 50 μm, one surface of which was treated with a silicone to impart releasability. A knife coater was used for the application of the composition.

The above adhesive film was slit in a tape form having a width of 5 mm. The coated side of the tape was press adhered to the peripheral surface of the above core along its lengthwise direction, and the releasable film was removed. Thus, the diffusively reflective film was transferred to the core. The thickness of the diffusively reflective film was about 300 μm, and the film had the sufficient hiding properties.

(3) Second Light-extracting Element (Light-extracting Light-transmissive Film)

A preparatory mixture containing isooctyl acrylate (90 wt. parts) and acrylic acid (10 wt. parts) as the raw materials, and IRGACURE 651 (0.1 wt. part) as a photopolymerization initiator was polymerized with UV light irradiation to obtain a partially polymerized syrup. To this syrup, 1,6-hexanediol diacrylate (1 wt. part) as a crosslinking monomer, and an additional photopolymerization initiator (IRGACURE 651) (0.2 wt. part) were added, and mixed until they were homogeneously mixed. Thus, a raw material composition for a light-extracting film was obtained.

Using this raw material composition and the above mold, the light-extracting film made of the UV cured material of this composition, which was used in this Example, was prepared. As a releasable film, a PET film (LUMILAR™ 50T available from TORAY having a thickness of 50 μm) was used.

The light-extracting film of this Example had a substrate, and a plurality of projections which were molded integrally with the substrate and had substantially the same height. The projection-dent pattern was a parallel stripe pattern.

A cross section of the projection in the across direction (a direction perpendicular to the lengthwise direction of the stripe) was about 0.4 mm$^2$, and the width of the top of the projection was about 0.5 mm. The thickness of the substrate was 0.2 mm. The dents were formed in a density of 5 dents/cm.

The modulus G of the projections of the light-extracting film was measured with the DYNAMIC ANALYZER "RDA II" (available from RHEOMETRIX) under the above described conditions. A tool for holding the sample in the measurement was parallel plates having a diameter of 7.9 mm. The modulus G was 6.7×10$^5$ dyne/cm$^2$. Thus, the projections had a moderate viscosity.

The change (decrease) of the $\log_{10}G$ was calculated from the changed value, which was read from the viscoelasticity spectrum obtained in the temperature range between 25° C. and 125° C. using the modulus G at 25° C. as the standard. The change of $\log_{10}G$ was zero (0).

The light transmission of the projection was about 80% with a photospectrometer, and the refractive indexes of the projections and substrate were both 1.47.

The above light-extracting film was slit in a 5 mm wide tape form along the direction perpendicular to the parallel stripe, and the projection side was adhered to the core along the lengthwise direction of the core, so that the light-extracting surface of the core was covered with the film tape. That is, the stripes of the projections were arranged so that they were perpendicular to the lengthwise direction of the core. The gap corresponding to the dents of the film maintained its shape and size, even after 5 months.

(4) Optical Fiber

Figure 1:
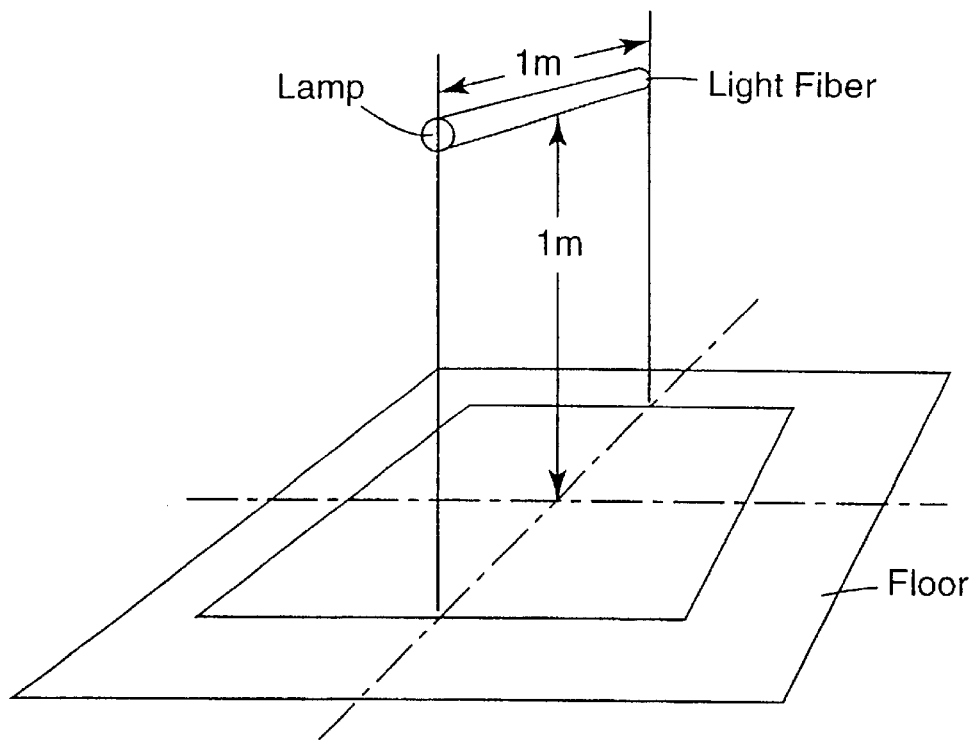
FIG. 1 shows an arrangement of an optical fiber and a light source in the measurement of the luminance in the Example.

The luminance of the optical fiber, which had been formed by providing the two types of light-extracting elements on the core, was evaluated as follows:

As shown in FIG. 1, the optical fiber (having a length of 1 m) was placed 1 m above the floor surface. Light beams were introduced in the optical fiber from one lengthwise end of the fiber, and a luminance was measured on the floor surface just below the center of the fiber. The luminance was 177 lux.

A luminance meter used was LUMINONETER "T-1H" (available from MINOLTA), and a light source was a halogen lamp having a reflection mirror "JCR-30W" (available from IWASAKI ELECTRIC).

For comparison, the luminance was measured with an optical fiber having only the first light-extracting element as the light-extracting means, and an optical fiber having only the second light-extractin, element as the light-extracting means. The luminances were 109 lux, and 138 lux, respectively.

It is understood from the above results that the optical fiber of the present invention can achieve the high luminance which cannot be achieved with the reflective light-extracting means (the first light-extracting element) only.

What is claimed is:

1. An optical fiber comprising a core which propagates light in its lengthwise direction, and a light extractor provided along the lengthwise direction of the core on at least a part of the peripheral surface of said core, wherein said light extractor comprises:

a) a light-extracting diffusely reflective element and b) a light-extracting light-transmissive element which is provided on a part of the peripheral surface of said core through which a light beam, which as been reflected by said light-extracting diffusively reflective element, leaks outside the core, wherein the light-extracting light-transmissive element comprises a light-transmissive light-extracting film, the light-extracting film comprising:

i) a light-transmissive substrate having an inner surface and an outer surface, and ii) a plurality of light-transmissive projections which are provided on the inner surface of the substrate, the projections being in contact with the peripheral surface of the core through so that a gap is maintained between the light-transmissive substrate and the peripheral surface of the core through which the reflected light beam leaks outside the core.

2. An optical fiber comprising a core which propagates light in its lengthwise direction, and a light extractor provided along the lengthwise direction of the core on at least a part of the peripheral surface of said core, wherein said light extractor comprises:

a) a light-extracting diffusely reflective element and b) a light-extracting light-transmissive element which is provided on a part of the peripheral surface of said core through which a light beam, which as been reflected by said light-extracting diffusively reflective element, leaks outside the core, wherein said light-extracting light-transmissive element comprises a light-transmissive light-extracting film, said light-extracting film comprising:

i) a light-transmissive substrate having substantially flat two main surfaces, and ii) a plurality of light-transmissive projections which are provided on one of said main surfaces of said substrate, are formed integrally with said substrate, and have substantially the same height;

said projections have a refractive index of at least 1.1; and said light-extracting film is in contact with the peripheral surface of said core through said projections so that a gap is maintained between said light-transmissive substrate and said peripheral surface of said core through which said reflected light beam leaks outside the core.

* * * * *